(12) United States Patent
Thomassin et al.

(10) Patent No.: US 10,006,358 B2
(45) Date of Patent: *Jun. 26, 2018

(54) ROTARY INTERNAL COMBUSTION ENGINE WITH PILOT SUBCHAMBER

(71) Applicant: PRATT & WHITNEY CANADA CORP., Longueuil (CA)

(72) Inventors: Jean Thomassin, Ste-Julie (CA); Nigel Davenport, Hillsburgh (CA); Eugene Gekht, Brossard (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 0 days. days.

This patent is subject to a terminal disclaimer.

(21) Appl. No.: 15/353,178

(22) Filed: Nov. 16, 2016

(65) Prior Publication Data
US 2017/0067395 A1    Mar. 9, 2017

Related U.S. Application Data

(63) Continuation of application No. 13/750,523, filed on Jan. 25, 2013, now Pat. No. 9,528,434, which is a
(Continued)

(51) Int. Cl.
*F02B 53/10* (2006.01)
*F01C 1/22* (2006.01)
(Continued)

(52) U.S. Cl.
CPC .............. *F02B 53/10* (2013.01); *F01C 1/22* (2013.01); *F01C 21/06* (2013.01); *F01C 21/106* (2013.01);
(Continued)

(58) Field of Classification Search
CPC .......... F01C 1/22; F01C 21/18; F01C 21/106; F01C 21/183; F01C 21/06; F01C 20/24;
(Continued)

(56) References Cited

U.S. PATENT DOCUMENTS 1,539,133 A   5/1925   Markle et al.
2,093,339 A   9/1937   Pipping
(Continued)

FOREIGN PATENT DOCUMENTS

CN   102691564   9/2012
DE    1926474    1/1970
(Continued)

OTHER PUBLICATIONS

NASA Contractor Report 189106, vol. 1, Stratified Charge Rotary Engine Critical Technology Enablement, vol. 1, 1992, pp. 1 to 94, C.E. Iron and R.E. Mount, Wood-Ridge, New Jersey.
(Continued)

*Primary Examiner* — Jason T Newton
(74) *Attorney, Agent, or Firm* — Norton Rose Fulbright Canada

(57) ABSTRACT

A non-Wankel rotary engine having an insert in the peripheral wall of the outer body, the insert being made of a material having a greater heat resistance than that of the peripheral wall, having a subchamber defined therein and having an inner surface bordering the cavity, the subchamber communicating with the cavity through at least one opening defined in the inner surface and having a shape forming a reduced cross-section adjacent the opening, a pilot fuel injector having a tip received in the subchamber, an ignition element having a tip received in the subchamber, and a main fuel injector extending through the housing and having a tip communicating with the cavity at a location spaced apart from the insert.

20 Claims, 7 Drawing Sheets

Related U.S. Application Data continuation-in-part of application No. 13/273,534, filed on Oct. 14, 2011, now Pat. No. 9,038,594.

(60) Provisional application No. 61/512,593, filed on Jul. 28, 2011.

(51) Int. Cl.

| | | |
|---|---|---|
| *F01C 21/06* | (2006.01) | |
| *F01C 21/10* | (2006.01) | |
| *F01C 21/18* | (2006.01) | |
| *F02B 19/12* | (2006.01) | |
| *F02B 53/02* | (2006.01) | |
| *F02B 53/12* | (2006.01) | |
| *F02B 55/08* | (2006.01) | |
| *F02B 19/10* | (2006.01) | |
| *F02B 19/16* | (2006.01) | |
| *F01C 11/00* | (2006.01) | |
| *F01C 20/06* | (2006.01) | |
| *F01C 20/10* | (2006.01) | |
| *F01C 20/24* | (2006.01) | |
| *F01C 21/08* | (2006.01) | |
| *F04C 29/00* | (2006.01) | |

(52) U.S. Cl.
CPC ............ *F01C 21/18* (2013.01); *F01C 21/183* (2013.01); *F02B 19/10* (2013.01); *F02B 19/108* (2013.01); *F02B 19/12* (2013.01); *F02B 19/165* (2013.01); *F02B 53/02* (2013.01); *F02B 53/12* (2013.01); *F02B 55/08* (2013.01); *F01C 11/006* (2013.01); *F01C 20/06* (2013.01); *F01C 20/10* (2013.01); *F01C 20/24* (2013.01); *F01C 21/08* (2013.01); *F04C 29/0092* (2013.01); *F04C 2240/80* (2013.01); *Y02T 10/125* (2013.01); *Y02T 10/17* (2013.01)

(58) Field of Classification Search
CPC ........ F01C 11/006; F01C 20/10; F01C 21/08; F01C 20/06; F04C 29/0092; F04C 2240/80; F02B 55/08; F02B 55/14
USPC ................ 60/209, 39.6, 39.62, 39.63, 39.64; 123/200, 205–212, 214, 231, 243, 273, 123/275, 284
See application file for complete search history.

(56) References Cited

U.S. PATENT DOCUMENTS

| | | | |
|---|---|---|---|
| 2,739,578 A | 3/1956 | Stump | |
| 2,932,289 A | 4/1960 | Witzky | |
| 2,935,054 A | 5/1960 | Franke et al. | |
| 3,044,454 A | 7/1962 | Sutton | |
| 3,058,452 A | 10/1962 | Espenschied | |
| 3,102,521 A | 9/1963 | Slemmons | |
| 3,126,876 A | 3/1964 | Lucas | |
| 3,391,677 A | 7/1968 | Héjj | |
| 3,508,530 A | 4/1970 | Clawson | |
| 3,512,907 A | 5/1970 | Belzner | |
| 3,722,480 A | 3/1973 | Berkowitz | |
| 3,736,080 A | 5/1973 | Sabet | |
| 3,779,215 A | 12/1973 | Sabet | |
| 3,857,369 A | 12/1974 | Sabet | |
| 3,861,361 A | 1/1975 | Klomp et al. | |
| 3,894,518 A | 7/1975 | Gavrun et al. | |
| 3,910,238 A | 10/1975 | James | |
| 3,941,097 A | 3/1976 | Seufer et al. | |
| 3,954,088 A | 5/1976 | Scott | |
| 3,957,021 A | 5/1976 | Loyd | |
| 3,976,036 A | 8/1976 | Muroki et al. | |
| 3,987,759 A | 10/1976 | Roberts et al. | |
| 4,009,688 A | 3/1977 | Hayashida et al. | |
| 4,029,058 A | 6/1977 | Jones | |
| 4,057,036 A | 11/1977 | Gibson | |
| 4,060,058 A | 11/1977 | Hideg et al. | |
| 4,066,044 A | 1/1978 | Jones et al. | |
| 4,074,956 A | 2/1978 | Maruyama et al. | |
| 4,077,366 A | 3/1978 | Hideg et al. | |
| 4,080,934 A | 3/1978 | Jones | |
| 4,083,329 A | 4/1978 | Myers | |
| 4,085,712 A | 4/1978 | Myers et al. | |
| 4,089,306 A | 5/1978 | Goloff | |
| 4,091,789 A | 5/1978 | Jones | |
| 4,096,828 A | 6/1978 | Satou et al. | |
| 4,108,136 A | 8/1978 | Hideg et al. | |
| 4,186,692 A | 2/1980 | Kawamura et al. | |
| 4,239,023 A | 12/1980 | Simko | |
| 4,259,932 A | 4/1981 | Hideg et al. | |
| 4,323,039 A | 4/1982 | Tsungekawa et al. | |
| 4,414,940 A * | 11/1983 | Loyd .................. | F02B 3/00 123/275 |
| 4,483,290 A | 11/1984 | Hass | |
| 4,577,600 A | 3/1986 | Morita et al. | |
| 4,616,611 A | 10/1986 | Ogawa et al. | |
| 4,651,692 A | 3/1987 | Morita et al. | |
| 4,662,331 A | 5/1987 | Ogawa et al. | |
| 4,672,933 A | 6/1987 | Taniguchi et al. | |
| 4,676,207 A | 6/1987 | Kawamura et al. | |
| 4,681,074 A | 7/1987 | Ogawa et al. | |
| 4,699,102 A | 10/1987 | Taniguchi | |
| 4,714,062 A | 12/1987 | Toeda | |
| 4,759,325 A | 7/1988 | Jones | |
| 4,873,952 A | 10/1989 | Narita et al. | |
| 4,875,444 A | 10/1989 | Tsuchida et al. | |
| 4,884,538 A | 12/1989 | Tanaka | |
| 4,899,707 A | 2/1990 | Matsuura | |
| 4,926,817 A | 5/1990 | Imoto et al. | |
| 4,962,736 A | 10/1990 | Matsuo et al. | |
| 5,014,662 A | 5/1991 | Trapy | |
| 5,022,366 A | 6/1991 | Abraham et al. | |
| 5,024,193 A | 6/1991 | Graze | |
| 5,065,714 A | 11/1991 | Matsuoka | |
| 5,109,817 A | 5/1992 | Cherry | |
| 5,163,385 A * | 11/1992 | McMillian .............. | F02B 19/14 123/23 |
| 5,168,846 A | 12/1992 | Paul | |
| 5,178,104 A | 1/1993 | Ito et al. | |
| 5,293,851 A * | 3/1994 | Schaub .................. | F02B 19/08 123/256 |
| 5,335,061 A | 8/1994 | Yamamoto et al. | |
| 5,520,864 A | 5/1996 | Frei | |
| 5,522,356 A | 6/1996 | Palmer | |
| 5,524,587 A | 6/1996 | Mallen et al. | |
| 5,540,056 A | 7/1996 | Heberling et al. | |
| 5,678,524 A | 10/1997 | Ofner et al. | |
| 5,709,189 A | 1/1998 | Monnier | |
| 5,720,251 A | 2/1998 | Round et al. | |
| 5,979,395 A | 11/1999 | Mallen et al. | |
| 6,062,188 A | 5/2000 | Okamura | |
| 6,125,813 A | 10/2000 | Louthan et al. | |
| 6,162,034 A | 12/2000 | Mallen | |
| 6,244,240 B1 | 6/2001 | Mallen | |
| 6,321,713 B1 | 11/2001 | Mallen | |
| 6,435,851 B2 | 8/2002 | Mallen | |
| 6,694,944 B2 | 2/2004 | Agama et al. | |
| 6,860,251 B1 | 3/2005 | Reed | |
| 6,892,692 B2 | 5/2005 | Barrett | |
| 7,370,626 B2 | 5/2008 | Schubert | |
| 7,753,036 B2 | 7/2010 | Lents et al. | |
| 7,775,044 B2 | 8/2010 | Julien et al. | |
| 7,832,372 B2 | 11/2010 | Blank | |
| 7,950,364 B2 | 5/2011 | Nerheim | |
| 8,033,264 B2 | 10/2011 | Lauter | |
| 9,038,594 B2 | 5/2015 | Thomassin et al. | |
| 9,057,321 B2 | 6/2015 | Reitz et al. | |
| 9,121,277 B2 | 9/2015 | Gekht et al. | |
| 9,200,563 B2 | 12/2015 | Thomassin | |
| 9,217,360 B2 | 12/2015 | Pierz | |
| 9,334,794 B2 | 5/2016 | Gaul et al. | |
| 9,353,680 B2 | 5/2016 | Villeneuve et al. | |
| 9,399,947 B2 | 7/2016 | Schulz et al. | |

(56) References Cited

U.S. PATENT DOCUMENTS

| | | |
|---|---|---|
| 9,528,434 B1 | 12/2016 | Thomassin et al. |
| 9,638,093 B2 | 5/2017 | Blank |
| 9,664,047 B2 | 5/2017 | McDaniel et al. |
| 2009/0309475 A1 | 12/2009 | Tozzi |
| 2012/0227397 A1 | 9/2012 | Willi et al. |
| 2013/0160734 A1 | 6/2013 | Redtenbacher et al. |
| 2013/0321612 A1 | 12/2013 | Bousquet et al. |
| 2014/0251258 A1 | 9/2014 | Thomassin et al. |
| 2014/0261293 A1 | 9/2014 | Schulz et al. |
| 2015/0275749 A1 | 10/2015 | Thomassin |
| 2015/0275756 A1 | 10/2015 | Bolduc et al. |
| 2016/0053667 A1 | 2/2016 | Loetz et al. |

FOREIGN PATENT DOCUMENTS

| | | |
|---|---|---|
| DE | 10121036 | 11/2002 |
| DE | 102011083143 | 3/2013 |
| EP | 2497902 | 9/2012 |
| EP | 2551448 | 1/2013 |
| GB | 1193878 | 6/1970 |
| JP | 49-12220 | 2/1974 |
| JP | 58-162721 | 9/1983 |
| JP | 59-007726 | 1/1984 |
| JP | 59-046317 | 3/1984 |
| JP | 59017252 | 4/1984 |
| JP | 6093124 | 5/1985 |
| JP | 61-083451 | 4/1986 |
| JP | 61-093227 | 5/1986 |
| JP | 61-123714 | 6/1986 |
| JP | 62-010418 | 1/1987 |
| JP | 628345 | 2/1987 |
| JP | 63179134 | 7/1988 |
| JP | 63179136 | 7/1988 |
| JP | S63159614 | 7/1988 |
| JP | S6480722 | 3/1989 |
| JP | 01-151722 | 6/1989 |
| JP | 3003940 | 1/1991 |
| JP | 3199627 | 8/1991 |
| JP | 04-140418 | 5/1992 |
| JP | 4-298641 | 10/1992 |
| JP | 6221176 | 8/1994 |
| JP | 3210027 | 7/2001 |
| JP | 3233138 | 9/2001 |
| JP | 4031630 | 10/2007 |
| JP | 2011-122598 | 6/2011 |
| RU | 2387851 | 12/2009 |
| SK | 6949 | 6/2014 |
| WO | 9857037 | 12/1998 |
| WO | 2008043154 | 4/2008 |
| WO | 2011092365 | 8/2011 |

OTHER PUBLICATIONS

Rotary Engine by Kenichi Yamamoto, 1981.
Barney Gaylord, Finding Top Dead Center (TDC) Casually—CS-111A, The MGA with An Attitude, 2012, pp. 1/2, Aug. 4, 2017.

* cited by examiner

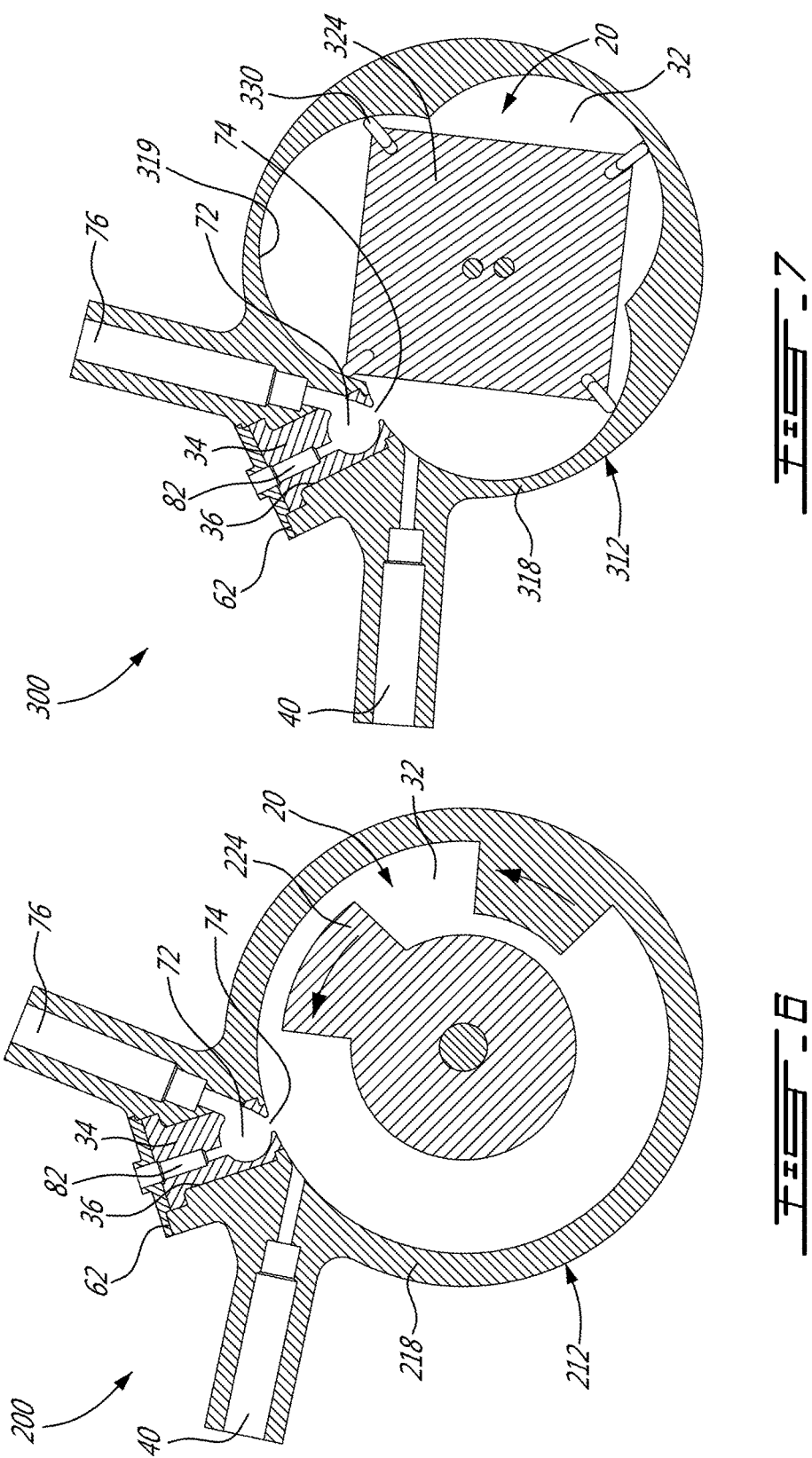

ROTARY INTERNAL COMBUSTION ENGINE WITH PILOT SUBCHAMBER

CROSS-REFERENCE TO RELATED APPLICATIONS

This application is a continuation of U.S. application Ser. No. 13/750,523 filed Jan. 25, 2013, which is a continuation-in-part of U.S. application Ser. No. 13/273,534 filed Oct. 14, 2011, which claims priority from provisional U.S. application No. 61/512,593 filed Jul. 28, 2011, the entire contents of all of which are incorporated by reference herein.

TECHNICAL FIELD

The application relates generally to a rotary internal combustion engine.

BACKGROUND OF THE ART

Rotary engines, such as for example Wankel engines, use the rotation of a piston to convert pressure into a rotating motion, instead of using reciprocating pistons. In these engines, the rotor typically includes a number of seals that remain in contact with a peripheral wall of the rotor cavity of the engine throughout the rotational motion of the rotor to create a plurality of rotating chambers when the rotor rotates.

Rotary engines come in many forms. One well-known type, the Wankel engine, has a generally triangular rotor received in a two-lobed epitrochoid cavity. Other non-Wankel rotary engines types exist as well. However, known arrangements are not optimized, in terms of combustion arrangements and characteristics, and thus room for improvement exists.

SUMMARY

In one aspect, there is provided a non-Wankel rotary engine comprising an outer body having an internal cavity defined by two axially spaced apart end walls and a peripheral wall extending between the end walls, a rotor body rotatable within the cavity in sealing engagement with the peripheral wall and defining at least one chamber of variable volume in the cavity around the rotor body, an insert in the peripheral wall of the outer body, the insert being made of a material having a greater heat resistance than that of the peripheral wall, the insert having a subchamber defined therein and having an inner surface bordering the cavity, the subchamber communicating with the cavity through at least one opening defined in the inner surface and having a shape forming a reduced cross-section adjacent the opening, a pilot fuel injector having a tip received in the subchamber, an ignition element having a tip received in the subchamber, and a main fuel injector extending through the outer body and having a tip communicating with the cavity at a location spaced apart from the insert.

In another aspect, there is provided an outer body for a non-Wankel rotary engine comprising two axially spaced apart end walls, a peripheral wall extending between the end walls and defining an internal cavity therewith for receiving a rotor therein, an insert in the peripheral wall of the outer body, the insert being made of a material having a greater heat resistance than that of the peripheral wall, the insert having a subchamber defined therein and having an inner surface bordering the cavity, the subchamber communicating with the cavity through at least one opening defined in the inner surface and having a shape forming a reduced cross-section adjacent the opening, at least one of the insert and the peripheral wall having a pilot fuel injector elongated hole defined therethrough communicating with the subchamber and sized to receive a pilot fuel injector therein, at least one of the insert and the peripheral wall having an ignition element elongated hole defined therethrough communicating with the subchamber and sized to receive an ignition element therein, and the peripheral wall having a main fuel injector elongated hole defined therethrough spaced apart from the insert and sized to receive a main fuel injector therein.

In yet another aspect, there is provided a method of injecting fuel into a non-Wankel rotary engine having rotating chambers each having a volume varying between a minimum volume and a maximum volume, the method comprising injecting a minor portion of the fuel into a subchamber defined adjacent to and in sequential communication with each of the rotating chambers and having a subchamber volume corresponding to from 5% to 25% of a sum of the minimum volume and the subchamber volume, igniting the fuel within the subchamber, partially restricting a flow of the ignited fuel from the subchamber to the rotating chambers, and injecting a remainder of the fuel into each of the rotating chambers sequentially, independently of and spaced apart from the subchamber.

In a further aspect, there is provided a rotary engine comprising: an outer body made of heat resistant material having a greater heat resistance than aluminium, the body having an internal cavity defined by two axially spaced apart end walls and a peripheral wall extending between the end walls, the cavity having an epitrochoid shape defining two lobes; a rotor body having three circumferentially spaced apex portions, the rotor body being engaged to an eccentric portion of a shaft to rotate and perform orbital revolutions within the cavity with each of the apex portions remaining in sealing engagement with the peripheral wall and separating three rotating chambers of variable volume defined in the cavity around the rotor body; a subchamber integrally defined in the peripheral wall of the outer body and communicating with the cavity through at least one opening defined in the peripheral wall, the subchamber having a shape forming a reduced cross-section adjacent the opening; a pilot fuel injector hole defined through the outer body for receiving a fuel injector and in communication with the subchamber; an ignition element hole defined through the outer body for receiving an ignition element and in communication with the subchamber; and a main fuel injector hole defined through the outer body and in communication with the cavity at a location spaced apart from the subchamber.

DESCRIPTION OF THE DRAWINGS

Reference is now made to the accompanying figures in which:

FIG. 6 is a schematic cross-sectional view of a rotary internal combustion engine in accordance with another embodiment;

FIG. 7 is a schematic cross-sectional view of a rotary internal combustion engine in accordance with another embodiment.

DETAILED DESCRIPTION

Figure 1:
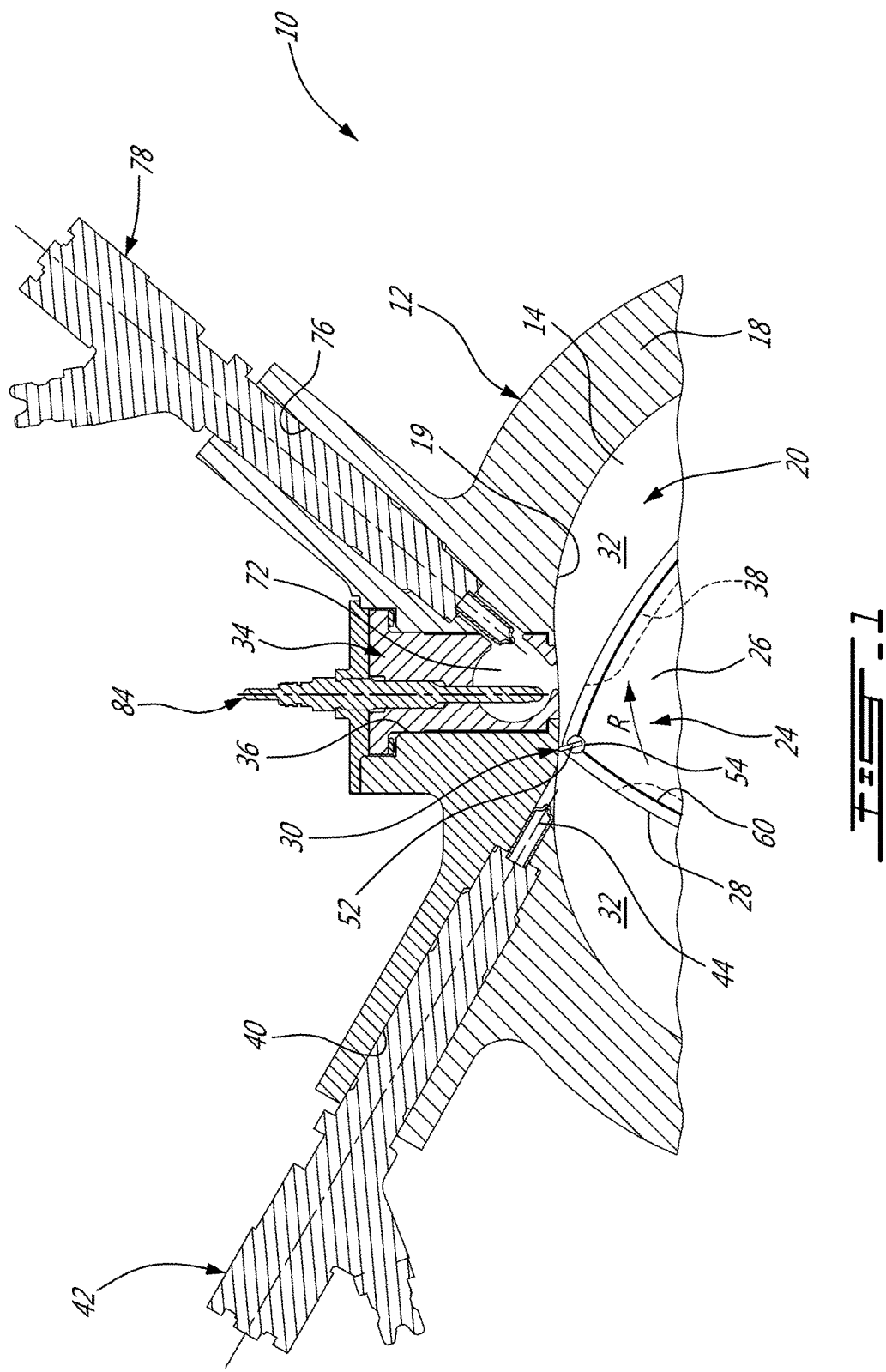
FIG. 1 is a partial, schematic cross-sectional view of a rotary internal combustion engine in accordance with a particular embodiment.

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 10 is used without a turbocharger, with air at atmospheric pressure.

The engine 10 comprises an outer body 12 having axially-spaced end walls 14 with a peripheral wall 18 extending therebetween to form a rotor cavity 20. The inner surface 19 of the peripheral wall 18 of the cavity 20 has a profile defining two lobes, which is preferably an epitrochoid.

An inner body or rotor 24 is received within the cavity 20, with the geometrical axis of the rotor 24 being offset from and parallel to the axis of the outer body 12. The rotor 24 has axially spaced end faces 26 adjacent to the outer body end walls 14, and a peripheral face 28 extending therebetween. The peripheral face 28 defines three circumferentially-spaced apex portions 30 (only one of which is shown), and a generally triangular profile with outwardly arched sides. The apex portions 30 are in sealing engagement with the inner surface of peripheral wall 18 to form three rotating working chambers 32 (only two of which are partially shown) between the inner rotor 24 and outer body 12. A recess 38 is defined in the peripheral face 28 of the rotor 24 between each pair of adjacent apex portions 30, to form part of the corresponding chamber 32.

The working chambers 32 are sealed. Each rotor apex portion 30 has an apex seal 52 extending from one end face 26 to the other and protruding radially from the peripheral face 28. Each apex seal 52 is biased radially outwardly against the peripheral wall 18 through a respective spring. An end seal 54 engages each end of each apex seal 52, and is biased against the respective end wall 14 through a suitable spring. Each end face 26 of the rotor 24 has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Although not shown in the Figures, the rotor 24 is journaled on an eccentric portion of a shaft and includes a phasing gear co-axial with the rotor axis, which is meshed with a fixed stator phasing gear secured to the outer body co-axially with the shaft. The shaft rotates the rotor 24 and the meshed gears guide the rotor 24 to perform orbital revolutions within the rotor cavity. The shaft rotates three times for each complete rotation of the rotor 24 as it moves around the rotor cavity 20. Oil seals are provided around the phasing gear to prevent leakage flow of lubricating oil radially outwardly thereof between the respective rotor end face 26 and outer body end wall 14.

At least one inlet port (not shown) is defined through one of the end walls 14 or the peripheral wall 18 for admitting air (atmospheric or compressed) into one of the working chambers 32, and at least one exhaust port (not shown) is defined through one of the end walls 14 or the peripheral wall 18 for discharge of the exhaust gases from the working chambers 32. The inlet and exhaust ports are positioned relative to each other and relative to the ignition member and fuel injectors (further described below) such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

As described further below, a pilot subchamber 72 is defined in the outer body 12, for pilot fuel injection and ignition. In this example, the pilot subchamber 72 is provided in an insert 34 received in a corresponding hole 36 defined through the peripheral wall 18 of the outer body 12, for pilot fuel injection and ignition. The peripheral wall 18 also has a main injector elongated hole 40 defined therethrough, in communication with the rotor cavity 20 and spaced apart from the insert 34. A main fuel injector 42 is received and retained within this corresponding hole 40, with the tip 44 of the main injector 42 communicating with the cavity 20 at a point spaced apart from the insert 34. The main injector 42 is located rearwardly of the insert 34 with respect to the direction R of the rotor rotation and revolution, and is angled to direct fuel forwardly into each of the rotating chambers 32 sequentially with a tip hole pattern designed for an adequate spray.

Figure 2:
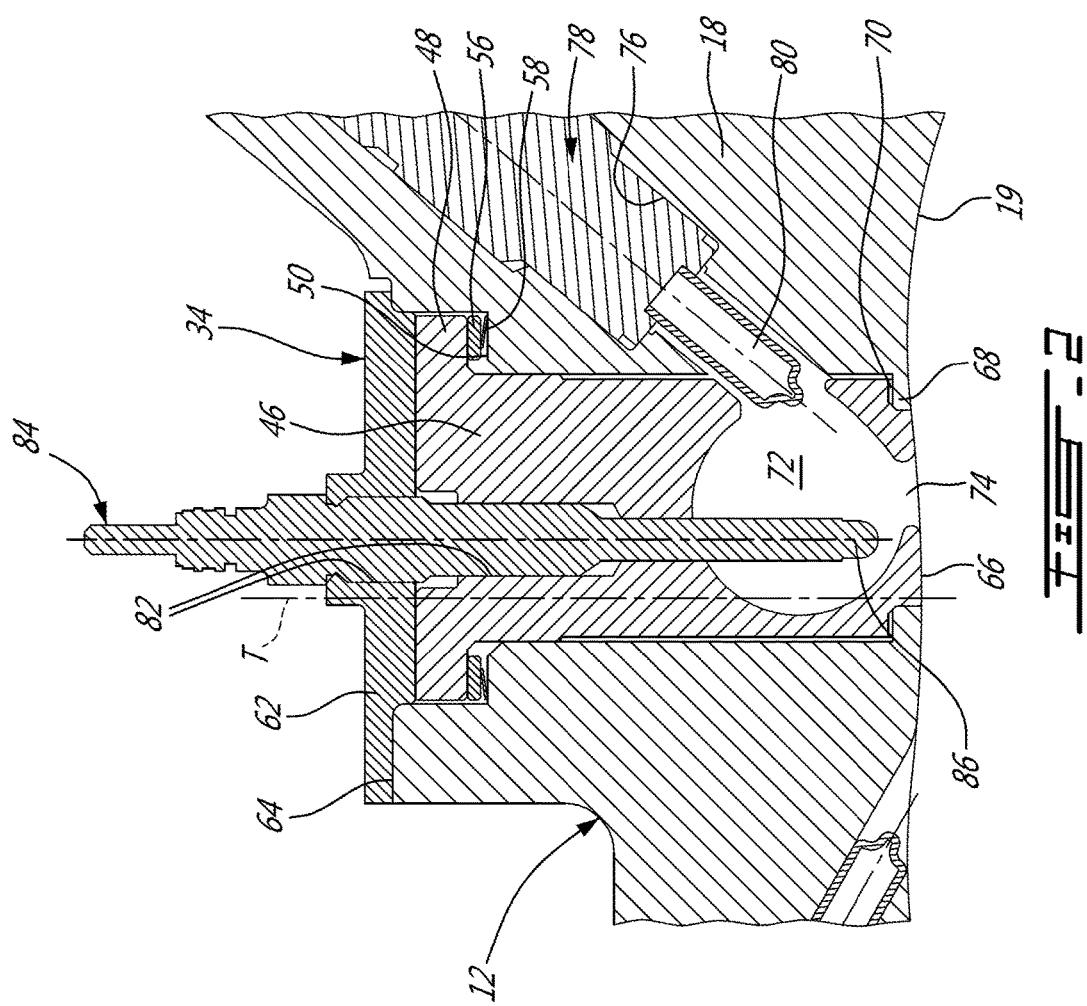
FIG. 2 is a schematic cross-sectional view of an insert of the engine of FIG. 1.

Referring particularly to FIG. 2, in this example the insert includes an elongated body 46 extending across a thickness of the peripheral wall 18, with an enlarged flange 48 at its outer end which is biased away from a shoulder 50 defined in the peripheral wall 18, and against a gasket (not shown) made of an appropriate type of heat resistant material such as a silica based material. A washer 56, such as for example a steel or titanium washer, and spring 58, such as for example a wave spring or a Belleville spring, are provided between the flange 48 and the shoulder 50 of the peripheral wall 18. The spring 58 biases the body 46 against a cover 62 having a cross-section greater than that of the hole 36 and extending over an outer surface 64 of the peripheral wall 18. The cover 62 is connected to the peripheral wall 18, for example through brazing. Alternate types of connections can also be used, including but not limited to a connection through fasteners such as bolts, to help facilitate replacement of the insert if necessary.

The insert body 46 has an inner surface 66 which is continuous with the inner surface 19 of the peripheral wall 20 to define the cavity 20. The insert hole 36 in the wall 18 defines a flange 68 extending in the insert hole 36 adjacent the inner surface 19, and the inner end of the insert body 46 is complementarily shaped to engage this flange 68, with a gasket 70 being received therebetween.

In this example, the insert body 46 is made of a material having a greater heat resistance than that of the peripheral wall 18, which in a particular embodiment is made of aluminium. In this particular embodiment, the insert body 46 is made of an appropriate type of ceramic.

The insert body 46 has a pilot subchamber 72 defined therein in communication with the rotor cavity 20. In the embodiment shown, the subchamber 72 has a circular cross-section; alternate shapes are also possible. The subchamber 72 communicates with the cavity through at least one opening 74 defined in the inner surface 66. The subchamber 72 has a shape forming a reduced cross-section adjacent the opening 74, such that the opening 74 defines a restriction to the flow between the subchamber 72 and the cavity 20. The opening 74 may have various shapes and/or be defined by a pattern of multiple holes. As can be seen in FIG. 2, the opening 74 has an area smaller than the maximum cross-sectional area of the subchamber 72, which is defined spaced apart from the opening 74.

The peripheral wall 18 has a pilot injector elongated hole 76 defined therethrough in proximity of the insert 34, extending at a non-zero angle with respect to a surface of an outer wall of the insert 34 and with respect to the longitudinal direction of the insert (which in the embodiment shown corresponds to the direction of the transverse axis T of the outer body 12). The pilot injector hole 76 is in communication with the subchamber 72. A pilot fuel injector 78 is received and retained within the corresponding hole 76, with the tip 80 of the pilot injector 78 being received in the subchamber 72. As can be seen in FIG. 2, the insert body 46 has an injector opening defined therethrough providing the communication between the pilot injector elongated hole 76 and the subchamber 72, and the tip 80 of the pilot injector 78 is received in the subchamber 72 through this injector opening, with a major part of the pilot injector 78 being received in the pilot injector elongated hole 76 outside of the insert 34. The opening providing the communication between the pilot injector elongated hole 76 and the subchamber 72 has an area smaller than the maximum cross-sectional area of the subchamber 72.

The insert body 46 and cover 62 have an ignition element elongated hole 82 defined therein extending along the direction of the transverse axis T of the outer body 12, also in communication with the subchamber 72. As can be seen in FIG. 2, the ignition element elongated hole 82 and the subchamber 72 communicate through an opening having an area smaller than the maximum cross-sectional area of the subchamber 72. An ignition element 84 is received and retained within the corresponding hole 82, with the tip 86 of the ignition element 84 being received in the subchamber 72. In the embodiment shown, the ignition element 84 is a glow plug. Alternate types of ignition elements 84 which may be used include, but are not limited to, plasma ignition, laser ignition, spark plug, microwave, etc.

The pilot injector 78 and main injector 42 inject fuel, which in a particular embodiment is heavy fuel e.g. diesel, kerosene (jet fuel), equivalent biofuel, etc. into the chambers 32. Alternately, the fuel may be any other adequate type of fuel suitable for injection as described, including non-heavy fuel such as for example gasoline or liquid hydrogen fuel. In a particular embodiment, at least 0.5% and up to 20% of the fuel is injected through the pilot injector 78, and the remainder is injected through the main injector 42. In another particular embodiment, at most 10% of the fuel is injected through the pilot injector 78. In another particular embodiment, at most 5% of the fuel is injected through the pilot injector 78. The main injector 42 injects the fuel such that each rotating chamber 32 when in the combustion phase contains a lean mixture of air and fuel.

Figure 3:
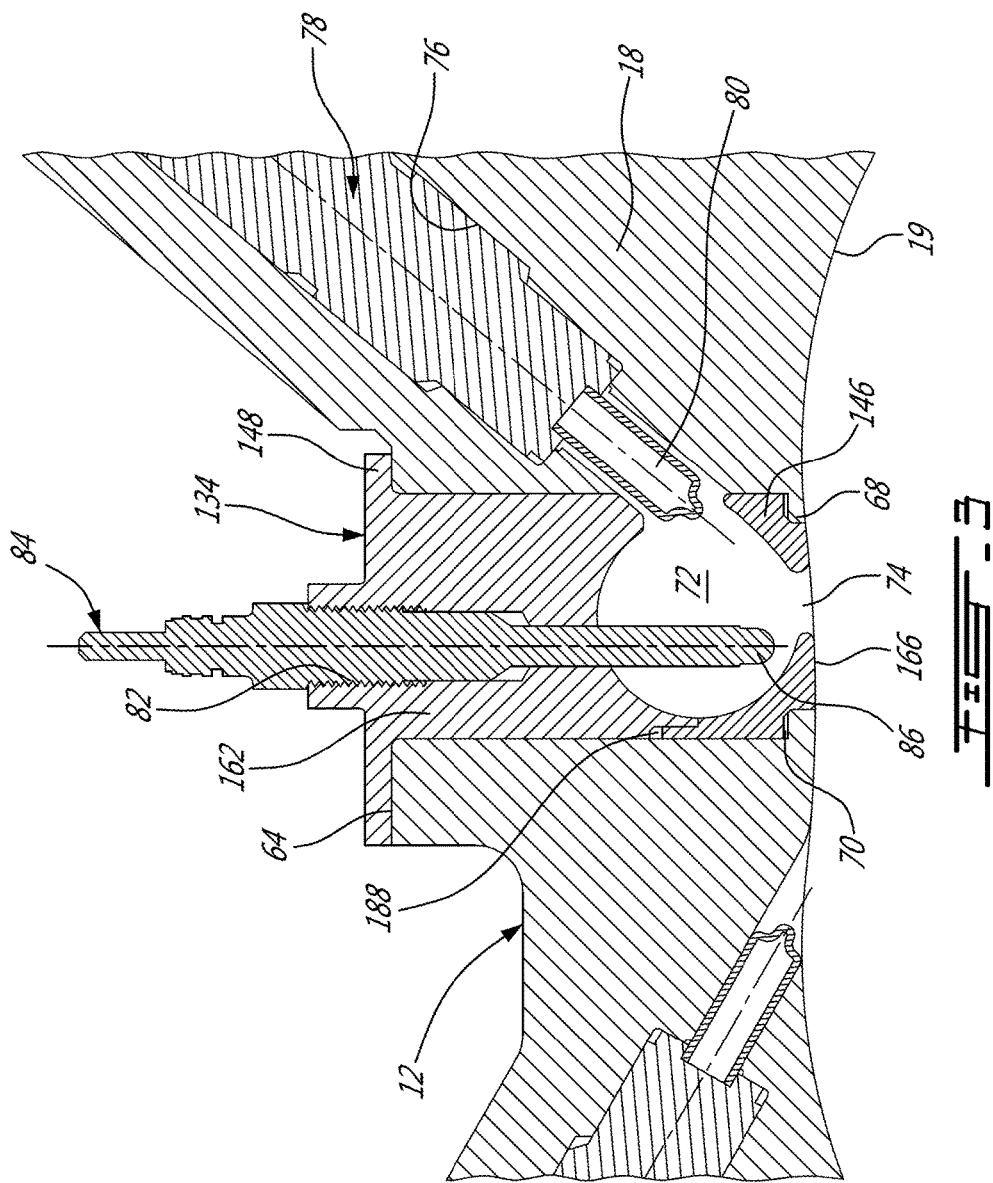
FIG. 3 is a schematic cross-sectional view of an insert in accordance with another embodiment.

Referring to FIG. 3, an insert 134 according to another embodiment is shown, engaged to the same outer body 12. The insert 134 extends across a thickness of the peripheral wall 18, and includes an inner body portion 146 and an outer body portion 162 which are attached together, for example through a high temperature braze joint 188. The outer body portion 162 has an enlarged flange 148 at its outer end which abuts the outer surface 64 of the peripheral wall 18 and is connected thereto, for example through bolts with appropriate sealing such as a gasket or crush seal (not shown). Alternate types of connections can also be used, including but not limited to a brazed connection.

The inner body portion 146 has an inner surface 166 which is continuous with the inner surface 19 of the peripheral wall 18 to define the cavity 20. The inner end of the inner body portion 146 is complementarily shaped to engage the flange 68 extending in the insert hole 36 adjacent the inner surface 19, with a gasket 70 being received therebetween.

In this particular embodiment, the body portions 146, 162 are made of an appropriate type of super alloy such as a Nickel based super alloy.

The pilot subchamber 72 is defined in the insert 134 at the junction between the body portions 146, 162, with the inner body portion 146 defining the opening 74 for communication between the subchamber 72 and the cavity 20. The outer body portion 162 has the ignition element elongated hole 82 defined therein along the direction of the transverse axis T and in communication with the subchamber 72. The ignition element 84 is received and retained within the corresponding hole 82, for example through threaded engagement. As in the previous embodiment, the tip 86 of the ignition element 84 is received in the subchamber 72.

Figure 4:
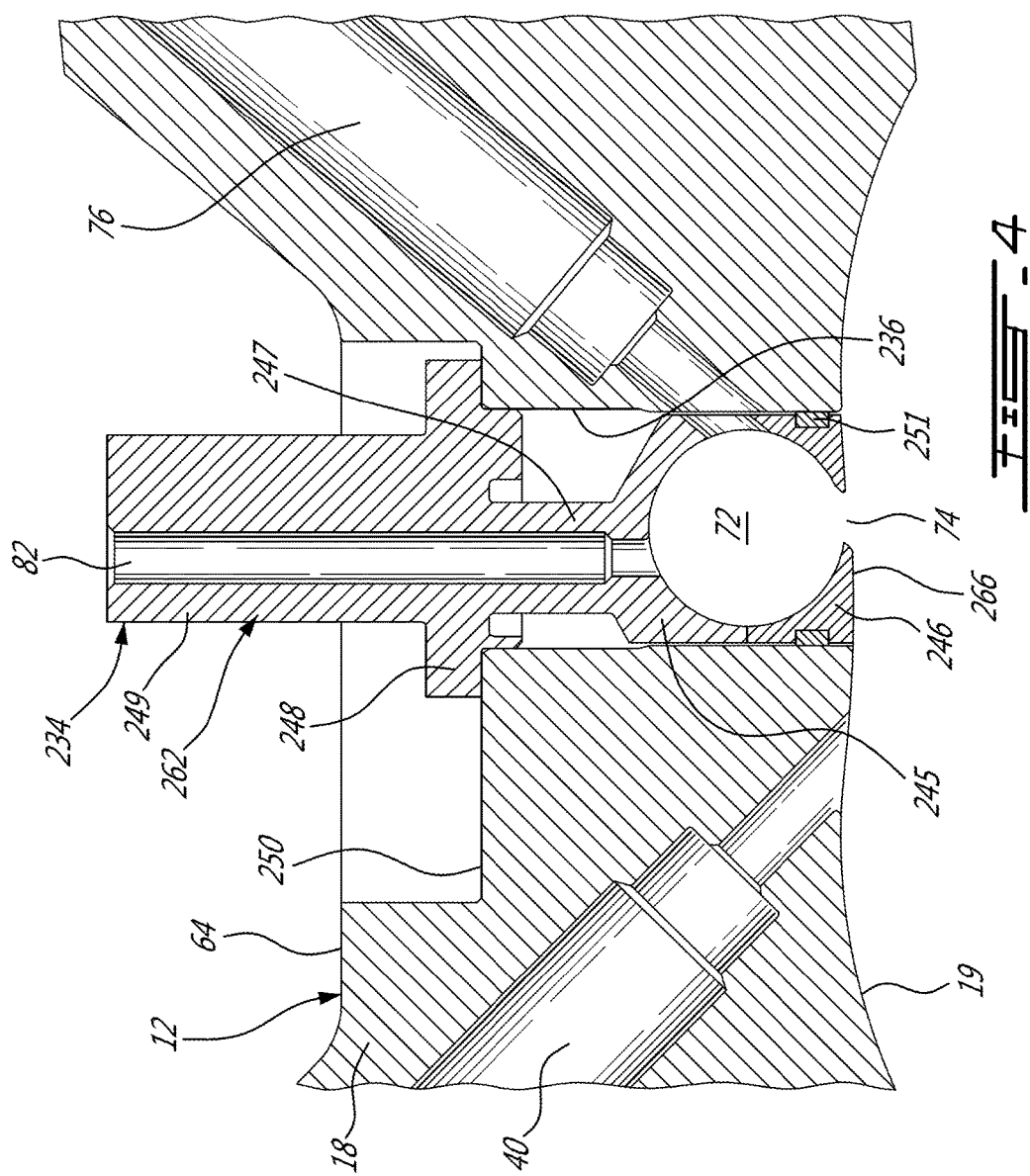
FIG. 4 is a schematic cross-sectional view of an insert in accordance with a further embodiment.

Referring to FIG. 4, an insert 234 according to another embodiment is shown. The insert 234 is received in a corresponding hole 236 defined through the peripheral wall 18. The insert 234 includes an inner body portion 246 and an outer body portion 262 which are attached together, for example through a high temperature braze joint, with the subchamber 72 being defined at the junction of the two portions 246, 262. The inner body portion 246 defines the opening 74 for communication between the subchamber 72 and the cavity 20.

The outer body portion 262 has the ignition element elongated hole 82 defined therethrough in communication with the subchamber 72. The outer body portion 262 includes an inner enlarged section 245 connected to the inner body portion 246 and defining the subchamber 72. The enlarged section 245 extends substantially across the width of the hole 236 around the subchamber 72, then tapers to a reduced width section 247 extending therefrom. The reduced width section 247 has at its outer end an enlarged flange 248 which abuts a shoulder 250 defined in the outer surface 64 of the peripheral wall 18 around the hole 236. An outer section 249, which in the embodiment shown has a width intermediate that of the sections 245 and 247, extends outwardly from the flange 248. The flange is connected to the shoulder, for example through bolts (not shown) with appropriate sealing such as a crush seal or a gasket (not shown) made of high temperature material, for example a silica based material or grafoil, between the flange 248 and shoulder 250. Alternate types of connections can also be used.

The inner body portion 246 has an inner surface 266 which is continuous with the inner surface 19 of the peripheral wall 18 to define the cavity 20. The inner body portion 246 includes a groove defined therearound near the inner surface 266, in which an appropriate seal 251, for example a silica based gasket tape, is received in contact with the walls of the insert hole 236. In this embodiment, the walls of the insert holes 236 are straight adjacent the inner surface 19, i.e. there is no flange adjacent the inner surface 19.

The volume of the subchamber 72 in the insert 34, 134, 234 is selected to obtain a stoichiometric mixture around ignition within an acceptable delay, with some of the exhaust product from the previous combustion cycle remaining in the subchamber 72. In a particular embodiment, the volume of the subchamber 72 is at least 0.5% and up to 3.5% of the displacement volume, with the displacement volume being defined as the difference between the maximum and minimum volumes of one chamber 32. In another particular embodiment, the volume of the subchamber 72 corresponds to from about 0.625% to about 1.25% of the displacement volume.

The volume of the subchamber 72 may also be defined as a portion of the combustion volume, which is the sum of the minimum chamber volume $V_{min}$ (including the recess 38) and the volume of the subchamber $V_2$ itself. In a particular embodiment the subchamber 72 has a volume corresponding to from 5% to 25% of the combustion volume, i.e. $V_2$=5% to 25% of $(V_2+V_{min})$. In another particular embodiment, the subchamber 72 has a volume corresponding to from 10% to 12% of the combustion volume, i.e. $V_2$=10% to 12% of $(V_2+V_{min})$.

The subchamber 72 may help create a stable and powerful ignition zone to ignite the overall lean main combustion chamber 32 to create the stratified charge combustion. The subchamber 72 may improve combustion stability, particularly but not exclusively for a rotary engine which operates with heavy fuel below the self ignition of fuel. The insert 34, 134, 234 made of a heat resistant material may advantageously create a hot wall around the subchamber which may further help with ignition stability.

The teachings herein are applicable to many rotary engine types, and not just Wankel engines. Therefore, in another embodiment, the rotary engine with subchamber the 72 may be a non-Wankel engine. A "non-Wankel" engine, as used in this description and the appended claims, means a rotary engine suitable for use with the present invention, but excluding Wankel type engines.

In a particular embodiment, the rotary engine may be a single or eccentric type rotary engine in which the rotor rotates about a fixed center of rotation. For example, the rotary engine may be a sliding vane engine, such as described in U.S. Pat. No. 5,524,587 issued Jun. 11, 1996 or in U.S. Pat. No. 5,522,356 issued Jun. 4, 1996, the entire contents of both of which are incorporated by reference herein.

Figure 5:
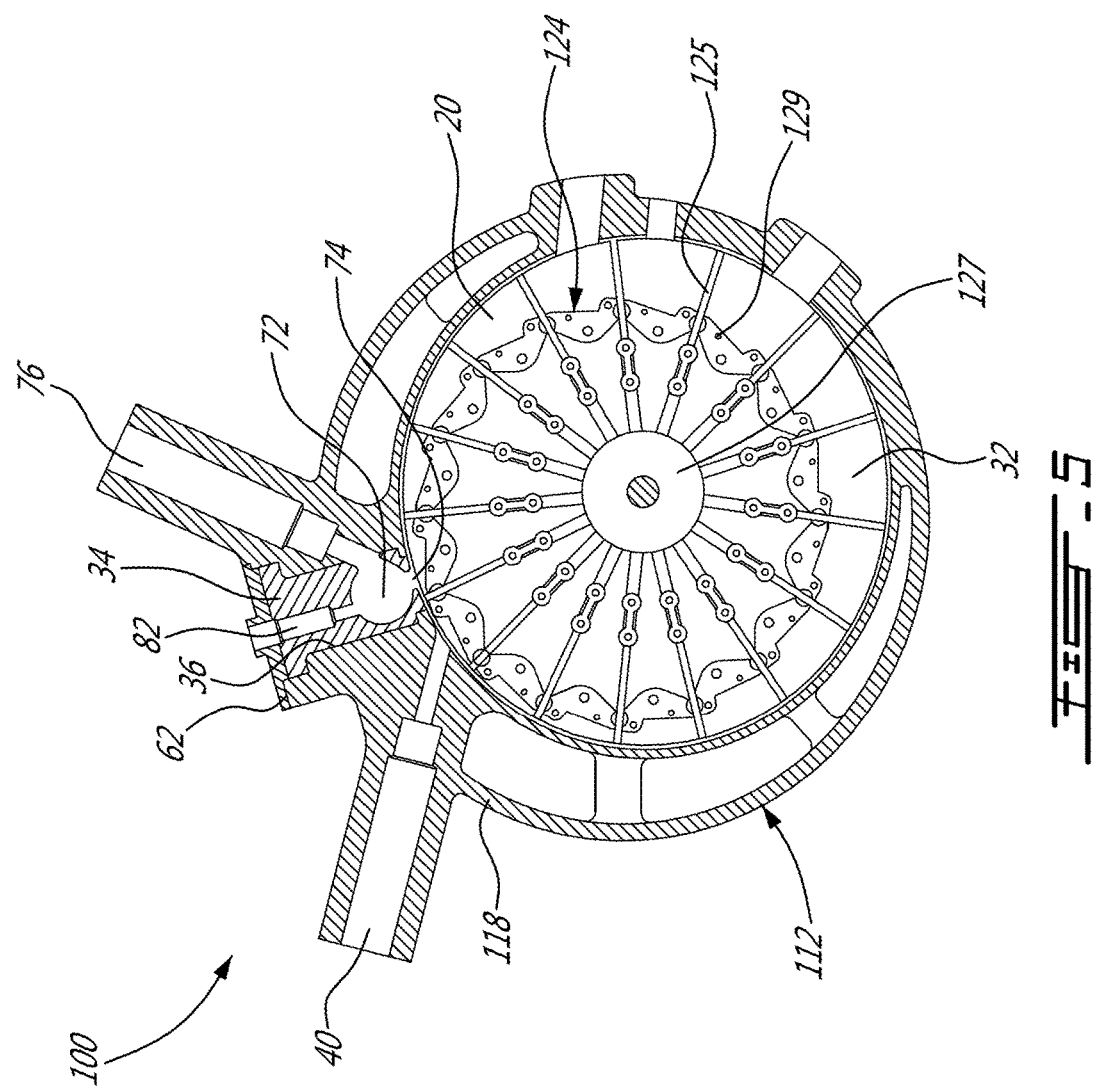
FIG. 5 is a schematic cross-sectional view of a rotary internal combustion engine in accordance with another embodiment.

Referring to FIG. 5, an example of a sliding vane engine 100 is shown. The engine 100 includes an outer body 112 defining a rotor cavity 20 receiving a rotor 124 having a number of vanes 125. The rotor 124 includes an inner hub assembly 127 rotating about a first axis and an outer hub assembly 129 rotating about a second axis offset from the first axis, with the two hub assemblies 127, 129 being mechanically linked. The vanes 125 are pivotally connected to the inner hub assembly 127 and are slidingly engaged through slots defined between adjacent sections of the outer hub assembly 129. The sections of the outer hub assembly 129 are thus sealingly engaged to the vanes 125 at different distances from the first axis of the inner hub assembly 127, defining a plurality of chambers 32 of variable volume within the cavity 20 around the rotor 124.

In the embodiment shown, the engine 100 includes the subchamber 72 described above, in this example defined in the insert 34 received in a hole 36 of a peripheral wall 118 of the outer body 112. The peripheral wall 118 also has a main injector elongated hole 40 defined therethrough, in communication with the rotor cavity 20 and spaced apart from the insert 34. The insert is biased against the cover 62 retaining the insert 34 within the hole 36. The insert 34 is made of a material having a greater heat resistance than that of the peripheral wall 18 and defines the pilot subchamber 72 in communication with the rotor cavity 20 through at least one opening 74. The peripheral wall 118 and/or the insert 34 has the pilot injector elongated hole 76 and the ignition element elongated hole 82 defined therethrough in communication with the subchamber 72. Other embodiments may be provided for the insert in the engine 100, including, but not limited to, the other inserts 134, 234 described above.

In another particular embodiment, the rotary engine may be an oscillatory rotating engine, including two or more rotors rotating at different angular velocities, causing the distance between portions of the rotors to vary and as such the chamber volume to change. Referring to FIG. 6, an example of such an engine is shown. The engine 200 includes an inner rotor 224 and an outer body or rotor 212 rotating at different angular velocities, the outer rotor 212 defining a rotor cavity 20 in which the inner rotor 212 is received. Chambers 32 of variable volume are defined within the cavity 20 around the inner rotor 224.

In the embodiment shown, the engine 200 includes the subchamber 72 described above, in this example defined in the insert 34 received in a hole 36 of a peripheral wall 218 of the outer body 212. The peripheral wall 218 also has the main injector elongated hole 40 defined therethrough spaced apart from the insert 34, and the peripheral wall 218 and/or the insert 34 has the pilot injector elongated hole 76 and the ignition element elongated hole 82 defined therethrough. Other embodiments may be provided for the insert in the engine 200, including, but not limited to, the other inserts 134, 234 described above.

In another particular embodiment, the rotary engine is a planetary rotating engine having a different geometry than that of the Wankel engine. Referring to FIG. 7, an example of such an engine is shown. The engine 300 includes an outer body 312 forming a rotor cavity 20 with a peripheral inner surface 319 thereof having an epitrochoid profile defining three lobes. The engine 300 also includes a rotor 324 with four apex portions 330 in sealing engagement with the peripheral inner surface 319 to form four rotating working chambers 32 of variable volume within the cavity 20 around the rotor 324. The rotor 324 is journaled on an eccentric portion of a shaft and performs orbital revolutions within the cavity 20.

In the embodiment shown, the engine 300 includes the subchamber 72 described above, in this example defined in the insert 34 received in a hole 36 of a peripheral wall 318 of the outer body 312. The peripheral wall 318 also has the main injector elongated hole 40 defined therethrough spaced apart from the insert 34, and the peripheral wall 318 and/or the insert 34 has the pilot injector elongated hole 76 and the ignition element elongated hole 82 defined therethrough. Other embodiments may be provided for the insert in the engine 300, including, but not limited to, the other inserts 134, 234 described above.

Figure 8:
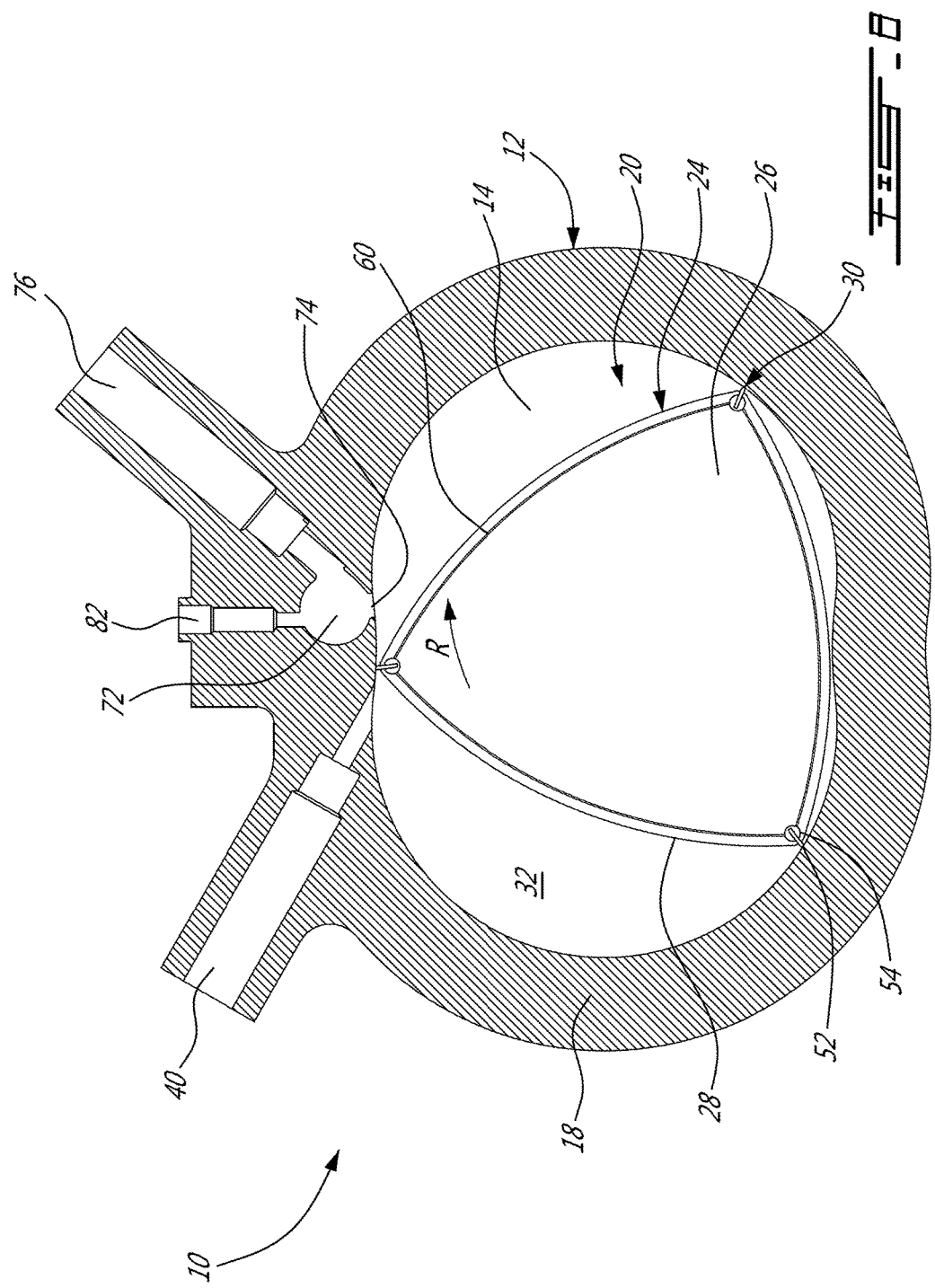
FIG. 8 is a schematic cross-sectional view of a rotary internal combustion engine in accordance with another embodiment.

The subchamber 72 may be provided integrally within the outer body 12, 112, 212, 312 of the engine 10, 100, 200, 300, provided the outer body 12, 112, 212, 312 is made of a material having adequate heat resistance and such other properties required to provide a suitable outer body. Referring to FIG. 8, the Wankel engine 10 is shown with the subchamber 72, pilot injector hole 76 and ignition element hole 82 integrally defined in the outer body 12, more particularly in the peripheral wall 18. In a particular embodiment, the outer body 12 is made of a material having a heat resistance greater than that of aluminium. In a particular embodiment, the outer body 12 is made of an appropriate type of ceramic or of an appropriate type of super alloy, such as for example a Nickel based super alloy. Though not shown, a wear insert may be provided in rotor cavity 20 for contacting the rotor sliding surfaces. The integral subchamber may be applied to any of the rotary engine configurations contemplated by the present description.

The above description is meant to be exemplary only, and one skilled in the art will recognize that changes may be made to the embodiments described without departing from the scope of the invention(s) disclosed. For example, the mechanical arrangements of the rotary engines described above are merely examples of many possible configurations which are suitable for use with the present invention(s). Any suitable injector configuration and arrangement may be used. Hence, modifications which fall within the scope of the present invention will be apparent to those skilled in the art, in light of a review of this disclosure, and such modifications are intended to fall within the appended claims.

The invention claimed is:

1. A non-Wankel rotary engine comprising:
   an outer body having an internal cavity defined by two axially spaced apart end walls and a peripheral wall extending between the end walls;
   a rotor body rotatable within the cavity in sealing engagement with the peripheral wall and defining at least one chamber of variable volume in the cavity around the rotor body;
   an insert in the peripheral wall of the outer body, the insert being made of a material having a greater heat resistance than that of the peripheral wall, the insert having a subchamber defined therein and having an inner surface bordering the cavity, the subchamber communicating with the cavity through at least one opening defined in the inner surface and having a shape forming a reduced cross-section adjacent the opening;
   a pilot fuel injector having a tip received in the subchamber;
   an ignition element having a tip received in the subchamber; and
   a main fuel injector extending through the outer body and having a tip communicating with the cavity at a location spaced apart from the insert.

2. The engine as defined in claim 1, wherein the volume of one of the at least one chamber varies between a minimum volume and a maximum volume with a difference between the maximum volume and the minimum volume defining a displacement volume, the subchamber having a volume of at least about 0.5% of the displacement volume and at most about 3.5% of the displacement volume.

3. The engine as defined in claim 1, wherein the rotor body rotates about a fixed axis of rotation.

4. The engine as defined in claim 1, wherein the at least one chamber includes a plurality of chambers, and the rotor body includes sliding vanes defining the chambers.

5. The engine as defined in claim 1, wherein the rotor body is engaged to an eccentric portion of a shaft to rotate and perform orbital revolutions.

6. The engine as defined in claim 1, wherein the volume of one of the at least one chamber varies between a minimum volume and a maximum volume, the subchamber having a volume corresponding to from 5% to 25% of a sum of the minimum volume and the volume of the subchamber.

7. The engine as defined in claim 1, wherein the insert is made of ceramic or super alloy.

8. The engine as defined in claim 1, wherein the pilot fuel injector extends through the peripheral wall at an angle with respect to the insert with only a portion thereof extending within the insert.

9. The engine as defined in claim 1, further comprising a heavy fuel source in communication with the fuel injectors.

10. An outer body for a non-Wankel rotary engine comprising:
    two axially spaced apart end walls;
    a peripheral wall extending between the end walls and defining an internal cavity therewith for receiving a rotor therein;
    an insert in the peripheral wall of the outer body, the insert being made of a material having a greater heat resistance than that of the peripheral wall, the insert having a subchamber defined therein and having an inner surface bordering the cavity, the subchamber communicating with the cavity through at least one opening defined in the inner surface and having a shape forming a reduced cross-section adjacent the opening;
    at least one of the insert and the peripheral wall having a pilot fuel injector elongated hole defined therethrough communicating with the subchamber and sized to receive a pilot fuel injector therein;
    at least one of the insert and the peripheral wall having an ignition element elongated hole defined therethrough communicating with the subchamber and sized to receive an ignition element therein; and
    the peripheral wall having a main fuel injector elongated hole defined therethrough spaced apart from the insert and sized to receive a main fuel injector therein.

11. The outer body as defined in claim 10, wherein the insert is made of ceramic or super alloy.

12. The outer body as defined in claim 10, wherein the peripheral wall has a major part of the pilot fuel injector elongated hole defined therethrough.

13. The outer body as defined in claim 10, wherein only the insert has the ignition element elongated hole defined therethrough.

14. A method of injecting fuel into a non-Wankel rotary engine having rotating chambers each having a volume varying between a minimum volume and a maximum volume, the method comprising:
    injecting a minor portion of the fuel into a subchamber defined adjacent to and in sequential communication with each of the rotating chambers and having a subchamber volume corresponding to from 5% to 25% of a sum of the minimum volume and the subchamber volume;
    igniting the fuel within the subchamber;

partially restricting a flow of the ignited fuel from the subchamber to the rotating chambers; and injecting a remainder of the fuel into each of the rotating chambers sequentially, independently of and spaced apart from the subchamber.

15. The method as defined in claim 14, wherein injecting a minor portion of the fuel into the subchamber includes injecting from 0.5% to 20% of the fuel.

16. The method as defined in claim 14, wherein the fuel is heavy fuel.

17. The method as defined in claim 14, wherein injecting the minor portion of the fuel is done into the subchamber with the subchamber volume corresponding to from 10% to 12% of the sum of the minimum volume and the subchamber volume.

18. The method as defined in claim 14, wherein injecting the minor portion of the fuel is done through an insert in a peripheral wall of the engine, with the subchamber being defined within the insert.

19. The method as defined in claim 14, wherein injecting the minor portion of the fuel is done in an angled direction with respect to a central transverse axis of an outer body of the engine.

20. The method as defined in claim 14, further comprising helping combustion with a hot wall around the subchamber by providing the subchamber in an insert made of a material more resistant to high temperature that a remainder of an outer body of the engine.

* * * * *